US009705298B2

(12) United States Patent
Dinh

(10) Patent No.: US 9,705,298 B2
(45) Date of Patent: Jul. 11, 2017

(54) FLOOR BOX COVER

(71) Applicant: Thomas & Betts International, LLC, Wilmington, DE (US)

(72) Inventor: Cong Thanh Dinh, Collierville, TN (US)

(73) Assignee: THOMAS & BETTS INTERNATIONAL, LLC, Wilmington, DE (US)

( * ) Notice: Subject to any disclaimer, the term of this patent is extended or adjusted under 35 U.S.C. 154(b) by 0 days.

(21) Appl. No.: 14/623,130

(22) Filed: Feb. 16, 2015

(65) Prior Publication Data

US 2015/0236486 A1 Aug. 20, 2015

Related U.S. Application Data

(60) Provisional application No. 61/939,911, filed on Feb. 14, 2014.

(51) Int. Cl.
| | | |
|---|---|---|
| *H02G 3/14* | (2006.01) | |
| *H02G 3/12* | (2006.01) | |
| *H02G 3/18* | (2006.01) | |
| *H02G 3/08* | (2006.01) | |

(52) U.S. Cl.
CPC ............ *H02G 3/185* (2013.01); *H02G 3/081* (2013.01); *H02G 3/12* (2013.01); *H02G 3/14* (2013.01)

(58) Field of Classification Search
CPC  H02G 3/081; H02G 3/12; H02G 3/14; H02G 3/083; H02G 3/121; H02G 3/123; H02G 3/185; H02G 3/02; H02G 3/088; H02G 3/22; H02G 3/283; H02G 3/383; A47B 21/06; H05K 5/03; H01R 13/447; H01R 13/453; H01R 13/4532; H01R 13/4534; H01R 13/4536; H01R 13/4538
USPC .......... 220/3.2–3.9, 241, 242; 174/50, 50.52, 174/53, 57, 58, 66, 67, 481–490, 520; 439/535, 536, 136, 135, 538; 312/30, 312/223.3, 293.2, 293.3, 294, 322, 325
See application file for complete search history.

(56) References Cited

U.S. PATENT DOCUMENTS

| | | |
|---|---|---|
| 3,956,573 A | 5/1976 | Myers |
| 4,289,921 A | 9/1981 | Gartner |
| 4,408,813 A | 10/1983 | Koehler |
| 4,656,798 A | 4/1987 | Hazen |

(Continued)

FOREIGN PATENT DOCUMENTS

| | | |
|---|---|---|
| CA | 2315574 | 3/2001 |
| CA | 2499236 | 3/2001 |

(Continued)

*Primary Examiner* — Dimary Lopez Cruz
(74) *Attorney, Agent, or Firm* — Butler Snow LLP

(57) ABSTRACT

An electrical floor box assembly and cover are provided. The floor box cover includes an access door that is designed to be repositioned. The access door is repositioned by lifting, sliding, or moving back and securing into one of at least two closed (flat) positions. When the access door is secured in a closed "not in service" position, the access door is watertight with a single gasket or seal. A second gasket or seal is provided below the cover for further watertightness. When the access door is secured in a closed "in service" position, one or more apertures for cords are revealed, thereby permitting cords plugged into an outlet within the floor box assembly to protrude through the apertures.

13 Claims, 7 Drawing Sheets

(56) References Cited

U.S. PATENT DOCUMENTS

| | | | |
|---|---|---|---|
| 4,731,032 A | 3/1988 | Noorily | |
| 4,770,643 A | 9/1988 | Castellani | |
| 4,883,924 A * | 11/1989 | Hadfield | H02G 3/185 |
| | | | 174/482 |
| 5,106,326 A | 4/1992 | Tsuji et al. | |
| 5,167,047 A * | 12/1992 | Plumley | A47B 21/06 |
| | | | 16/2.1 |
| 5,240,426 A | 8/1993 | Barla | |
| 5,306,178 A * | 4/1994 | Huang | H01R 13/5213 |
| | | | 174/67 |
| 5,547,388 A | 8/1996 | Hill | |
| 5,796,037 A | 8/1998 | Young et al. | |
| 6,179,634 B1 | 1/2001 | Hull | |
| 6,462,277 B1 * | 10/2002 | Young | H02G 3/185 |
| | | | 174/66 |
| 6,545,215 B2 | 4/2003 | Young | |
| 6,552,262 B2 | 4/2003 | English | |
| 6,610,927 B2 | 8/2003 | Dinh | |
| 6,612,081 B2 | 9/2003 | Cole | |
| 6,835,890 B2 | 12/2004 | Dinh | |
| 6,840,785 B2 | 1/2005 | Drane | |
| 6,854,226 B2 | 2/2005 | Cole | |
| 7,048,556 B2 | 5/2006 | Stanton | |
| 7,064,268 B2 * | 6/2006 | Dinh | H02G 3/185 |
| | | | 174/485 |
| 7,082,729 B2 | 8/2006 | Cole | |
| 7,105,745 B2 | 9/2006 | Drane | |
| 7,301,100 B2 | 11/2007 | Drane | |
| 7,319,193 B2 * | 1/2008 | Halterman | H02G 3/185 |
| | | | 174/482 |
| 7,459,632 B2 * | 12/2008 | Bowman | E04F 19/083 |
| | | | 174/482 |
| 7,579,549 B2 * | 8/2009 | Jolly | H02G 3/14 |
| | | | 174/50 |
| 7,795,544 B2 | 9/2010 | Peck | |
| 7,838,769 B2 | 11/2010 | Peck | |
| 8,025,510 B2 | 9/2011 | Bolshakov | |
| 8,119,912 B2 | 2/2012 | Thibault | |
| 8,363,386 B2 | 1/2013 | Cheng | |
| 2002/0092664 A1 | 7/2002 | Young | |
| 2002/0095887 A1 | 7/2002 | Cole | |
| 2002/0096350 A1 | 7/2002 | Young | |
| 2002/0096351 A1 | 7/2002 | English | |
| 2002/0116883 A1 | 8/2002 | Cole | |
| 2004/0050570 A1 | 3/2004 | Dinh | |
| 2004/0069516 A1 | 4/2004 | Cole | |
| 2004/0123997 A1 | 7/2004 | Drane | |
| 2004/0175975 A1 | 9/2004 | Drane | |
| 2006/0180332 A1 | 8/2006 | Dinh | |
| 2006/0249296 A1 | 11/2006 | Drane | |
| 2009/0038842 A1 | 2/2009 | Peck | |
| 2009/0163058 A1 | 6/2009 | Craig | |
| 2009/0194312 A1 | 8/2009 | Jolly | |
| 2001/0061886 | 3/2011 | Gow | |

FOREIGN PATENT DOCUMENTS

| | | | |
|---|---|---|---|
| CA | 2435203 | 7/2002 | |
| CA | 2420560 | 8/2002 | |
| CA | 2421814 | 8/2002 | |
| CA | 2424773 | 8/2002 | |
| CA | 2377066 | 9/2002 | |
| CA | 2457508 | 7/2004 | |
| CA | 2536033 | 8/2006 | |
| CA | 2451456 | 6/2008 | |
| CA | 2626297 | 7/2009 | |
| CA | 2639718 | 3/2010 | |
| CA | 2714738 | 3/2011 | |
| EP | 2398115 | 12/2011 | |
| WO | 02058502 | 7/2002 | |
| WO | 02060028 | 8/2002 | |
| WO | 02060233 | 8/2002 | |
| WO | 02067396 | 8/2002 | |
| WO | 2011157270 | 12/2011 | |
| WO | 2013/063640 | * 5/2013 | H02G 3/185 |

* cited by examiner

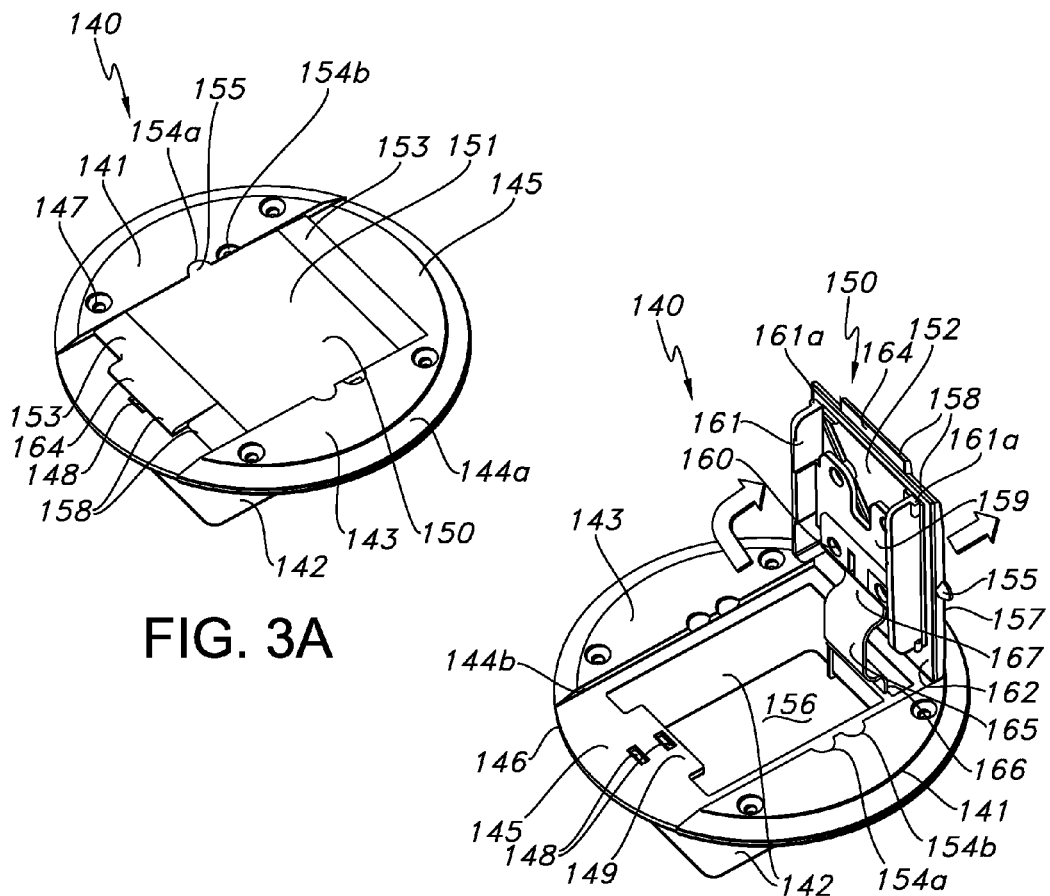

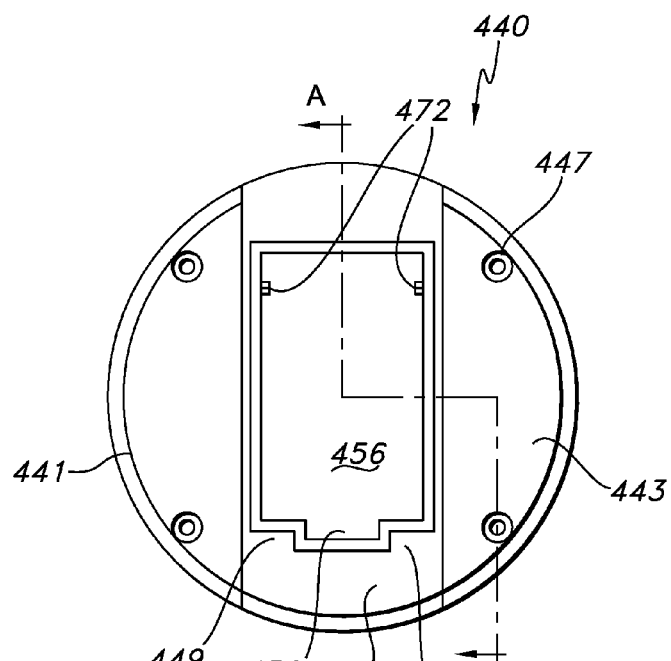
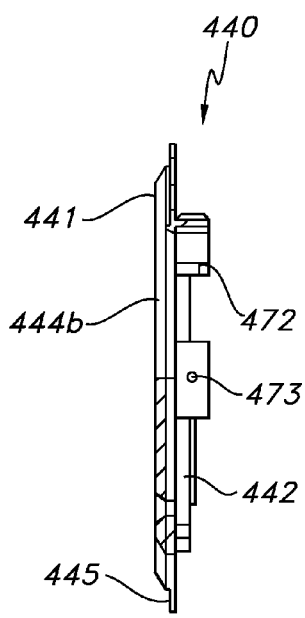
FIG. 7A
FIG. 7B
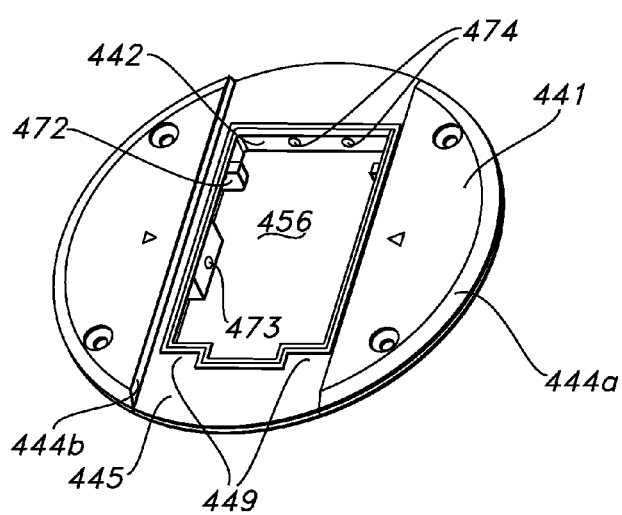
FIG. 7C

FLOOR BOX COVER

CROSS-REFERENCES TO RELATED APPLICATIONS

This application claims the benefit of U.S. Provisional Application No. 61/939,911 to Cong Thanh Dinh, filed Feb. 14, 2014, which is incorporated herein by reference in its entirety.

FIELD OF THE INVENTION

In general, the present invention relates to an electrical floor box assembly and cover and, in particular, to a floor box cover with an access door that lifts, slides or moves with tether back and secures into a closed position leaving one or more apertures for cords, and floor box assemblies utilizing the same.

BACKGROUND OF THE INVENTION

Floor box assemblies provide a convenient means for placing electrical, data, and/or communication outlets near a user without running cords on the floor, which can be a safety hazard. It is desirable to provide a floor box assembly with a cover that has an access door that is designed to be repositioned by lifting, sliding, or moving back and securing into closed ("flat") positions that are either watertight with a single gasket and/or reveal one or more apertures for cords plugged into an outlet within the floor box assembly.

SUMMARY OF THE INVENTION

One aspect of the present invention is to provide an electrical floor box cover comprising a cover plate having an aperture to permit access within said assembly and a repositionable access door pivotally mounted to said cover plate by a hinge, wherein said hinge is capable of sliding to allow said access door to be positioned in a plurality of closed positions that cover all or a portion of said aperture.

Another aspect of the invention is to provide an electrical floor box cover comprising a cover plate having an aperture to permit access within said assembly and a removable and repositionable access door attached to said cover plate by a tether, wherein said tether allows said access door to be positioned in a plurality of closed positions that cover all or a portion of said aperture.

A further aspect of the invention is to provide an electrical floor box assembly comprising an outlet (recessed) box and an electrical box cover assembly, wherein said electrical box cover assembly comprises a cover plate having an aperture to permit access within said assembly and an access door, wherein said access door is selected from the group consisting of a repositionable access door pivotally mounted to said cover plate by a hinge, wherein said hinge is capable of sliding to allow said access door to be positioned in a plurality of closed positions that cover all or a portion of said aperture or a removable and repositionable access door attached to said cover plate by a tether, wherein said tether allows said access door to be positioned in a plurality of closed positions that cover all or a portion of said aperture.

BRIEF DESCRIPTION OF THE DRAWINGS

Further advantages of the invention will become apparent by reference to the detailed description of preferred embodiments when considered in conjunction with the drawings:

FIG. 3A is a perspective view of the cover assembly according to another embodiment of the present invention with the access door in a closed "not in service" position.

FIG. 3B is a perspective view of the cover according to the embodiment of the present invention shown in FIG. 3A with the access door open.

FIG. 3C is a perspective view of the cover according to the embodiment of the present invention shown in FIG. 3A with the access door in a closed "in service" position leaving two apertures 163a & 163b for cords, cables, wires, etc.

FIG. 7A is a top plan view of the cover assembly cover plate 441 with the access door not shown.

FIG. 7B is a cross-sectional view of the cover plate 441 shown in FIG. 7A highlighting the shortened flange 442.

FIG. 7C is a perspective view of the cover plate 441 shown in FIG. 7A with the access door not shown.

DETAILED DESCRIPTION

The following detailed description is presented to enable any person skilled in the art to make and use the invention. For purposes of explanation, specific details are set forth to provide a thorough understanding of the present invention.

However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

The present invention provides an electrical floor box assembly and cover and, in particular, a floor box cover with an access door that lifts, slides, or moves with a tether and secures into a closed position leaving one or more apertures for cords (cords, wires, cables, etc.) and a floor box assembly utilizing the cover described. When no cords are inserted into the floor box, the access door may be moved and/or slid and secured into a closed "not in service" position. The access door is lifted to expose an aperture in the cover plate for inserting cords into the floor box. The access door is then moved and/or slid and secured into a closed "in service" position along a recessed plane leaving one or more apertures for said cords to be placed.

Figure 1:
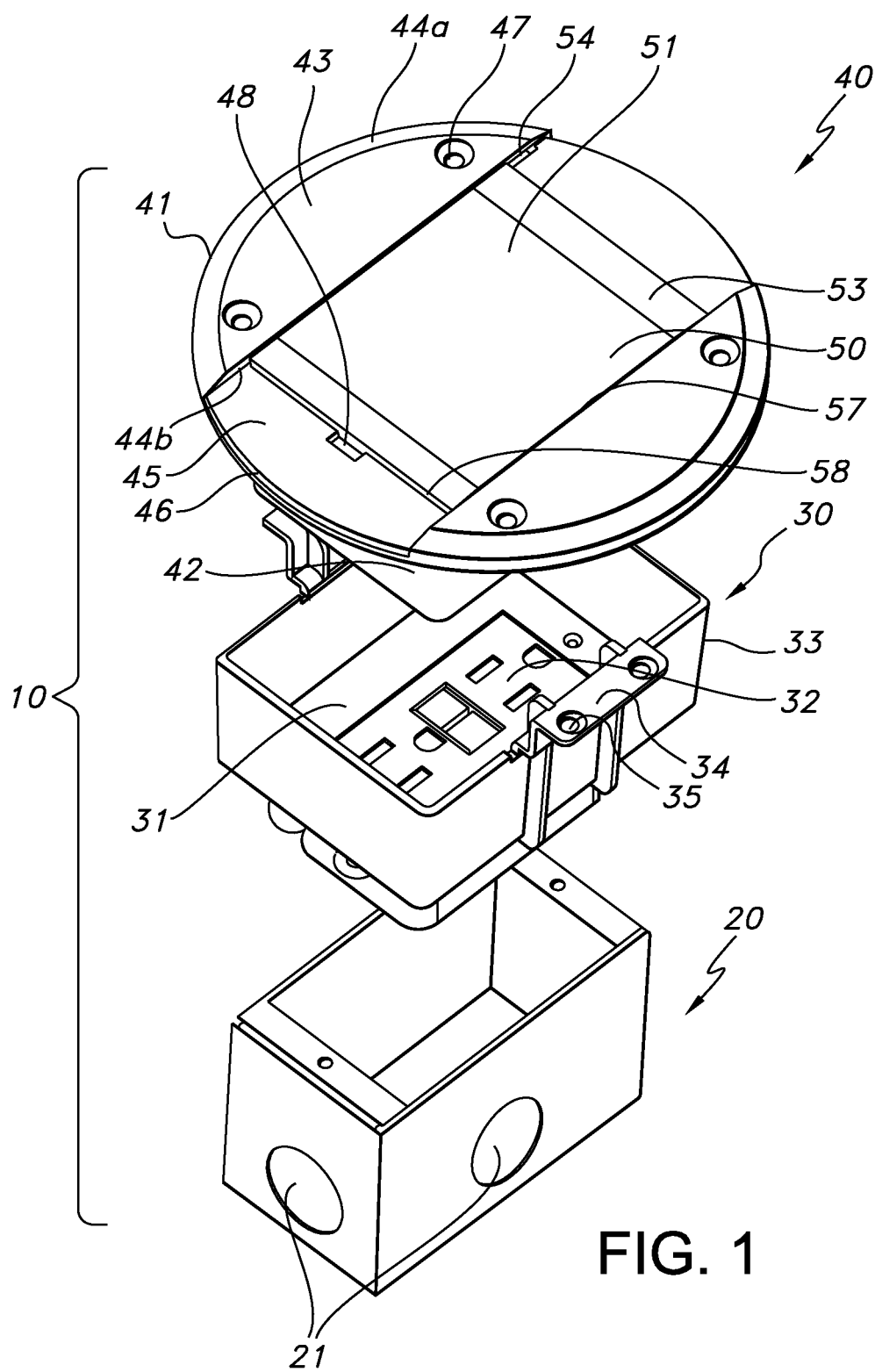
FIG. 1 is a perspective view of a floor box assembly with electrical box, recessed floor (outlet) box, and the cover assembly according to one embodiment of the present invention with the access door in a closed "not in service" position.

Referring to the drawings, FIG. 1 shows a perspective view of a floor (or electrical) box assembly 10 comprising electrical box 20, recessed floor (outlet) box 30, and cover assembly 40 according to one embodiment of the present invention. Electrical box 20 may have one or more knockout holes 21 for access to and installing cords to supply electricity, data, and/or communication to the assembly. One or more gaskets are placed under cover assembly 40 or above/around recessed (outlet) box 30 to prevent water or other liquids from entering the assembly 10. Preferably, at least two gaskets are used: one under cover assembly 40 and one around the top portion of recessed box 30 (or integrated box 430). Alternatively, caulking around electrical box 20 and/or recessed floor box 30 under cover assembly 40 can be used to prevent water or other liquids from entering the assembly 10. Floor box assembly 10 is capable of being positioned or attached to a floor structure or poured concrete flooring, and, therefore, may take on any size and shape as necessary according to the functional or aesthetic needs of a consumer. Therefore, it is within the contemplation of the invention that all components of floor box assembly 10 can be of any shape or size as known in the art or designed for a specific application according to the functional or aesthetic needs of a consumer. Although floor box assembly 10 is depicted with single-gang electrical box 20, recessed floor box 30, and electrical receptacle 31 having two grounded 120 volt outlets, it should be understood that floor box assembly 10 & 410 may also be configured for single-gang applications for data, communication, or other low voltage connections. It should also be understood that floor box assembly 10 may be configured for multi-gang applications for data, communication, or other low voltage outlets (audio-visual, coaxial, etc.), or electrical outlets (with any useable or desired voltage output), or applications having a combination of electrical outlets and data, communication, or other low voltage outlets by positioning a voltage divider (not shown). All such possible configurations are within the contemplation of the invention, but only a single configuration is described in detail for sake of brevity.

The cover assembly 40 is comprised of at least cover plate 41 and repositionable access door 50. Cover assembly 40 can be made of any metal or plastic material known in the art. Preferably, cover assembly 40 is made of steel, brass, aluminum, or polycarbonate reinforced with a steel plate. In FIG. 1, cover assembly 40 is shown with the access door 50 in a closed "not in service" position, meaning that no cords are plugged into outlet 32 of recessed box 33. When in the closed "not in service" position, cover assembly 40 is water resistant and prevents dust and debris from entering recessed floor box 30. Cover plate 41 may include exposed fastener holes 47 for attachment of cover plate 41 to another object, for example a floor structure. Any acceptable fastener device may be used. As shown in FIG. 1, fastener holes 47 are configured for a countersunk screw or bolt (not shown) to maintain a substantially flat surface of cover assembly 40. Cover plate 41 may be configured in any size or shape as necessary according to the functional or aesthetic needs of a consumer. As shown in FIG. 1, cover plate 41 is provided in a round shape, but other shapes are within the scope and spirit of the present invention, see for example FIG. 4A. Also, cover plate 41 may be configured to have recessed walls (flange) 42 surrounding all sides extending down toward electrical box 20 and recessed floor box 30. Recessed walls 42 or the lower surface of cover plate 41 may provide elements (not shown) for attachment corresponding to box flange 34 and fastener holes 35. Recessed walls 42 may be configured to maintain a desired depth for receptacle 31. Recessed walls 42 terminate at an opening at one end to expose the receptacle 31, and at the other end as aperture 56 (see FIG. 2A).

Cover plate 41 has a planar top surface 43 that is substantially flat to minimize tripping or furniture becoming obstructed by cover assembly 40. Alternatively, top surface 43 may be configured to have a recessed top surface (not shown) for receiving flooring material to match or coordinate with its installation location. Fastener holes 47 may be positioned on top surface 43, as shown in FIG. 1, or located elsewhere on cover plate 41. To further minimize tripping or furniture becoming obstructed by cover assembly 40, top surface 43 has outward facing edges 44a that are preferably tapered, beveled, or rounded. Cover plate 41 further has a channel or recessed portion 45 (in relation to top surface 43) in which access door 50 is positioned. Recessed portion 45 is preferably configured to be just wider than access door 50 so that only a minimal amount of space will exist between access door 50 side edges 57 and top surface 43 side edges 44b. The outward facing edges 46 of recessed portion 45 may similarly be rounded, tapered, or beveled.

Access door 50 has a planar top surface 51 that is substantially flat to minimize tripping or furniture becoming obstructed by cover assembly 40. Alternatively, top surface 51 may be configured to have a recessed top surface (not shown) for receiving flooring material to match or coordinate with its installation location. Now referring to FIG. 2A, access door 50 has side edges 57 that face toward side edges 44b of top surface 43, and side edges 58 that face toward recessed portion 45. Edges 44b of top surface 43 are substantially the same height as top surface 51 alongside edges 57, so that top surface 43 and top surface 51 are flush. The end portions 53 of top surface 51 near side edges 58 are preferably tapered, beveled, or rounded to minimize tripping or furniture becoming obstructed by cover assembly 40. At one end of access door 50, positioned on either side of the junction of edges 44b and recessed portion 45, a pair of slots or grooves 54 (see FIG. 1) is configured for receiving attachment portion or sliding hinge 55 of access door 50 to pivotally mount access door 50 to cover plate 41. As shown in the embodiment in FIG. 2A, sliding hinge 55 consists of two extension portions (one on either side of access door 50 corresponding to grooves 54) on side edges 57 near side edge 58 opposite the plurality of notches 48.

Figure 2A:
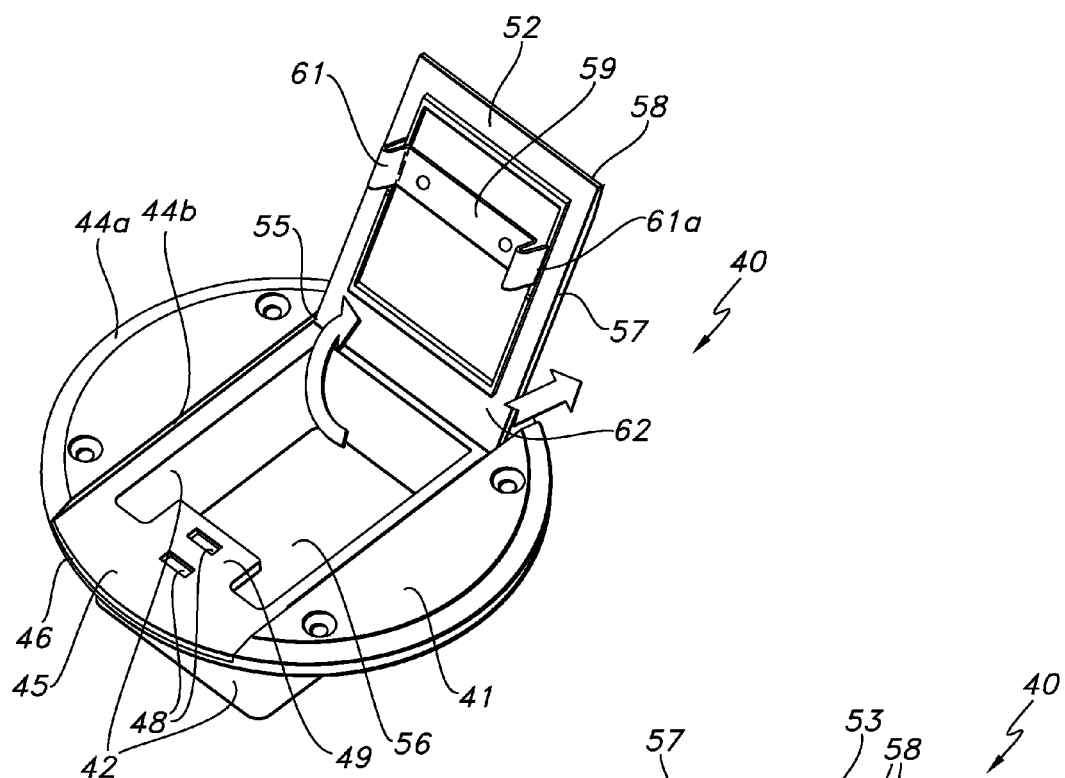
FIG. 2A is a perspective view of the cover according to the embodiment of the present invention shown in FIG. 1 with the access door open.

In FIG. 2A, there is shown the bottom surface 52 of access door 50. Bottom surface 52 includes securing apparatus, such as access door lock bracket 59. Access door lock bracket 59 is attached to bottom surface 52 by fasteners, which may include screws, bolts, rivets, or similar fasteners (not shown) corresponding to holes 60. Access door lock bracket 59 shown here includes a pair of opposite facing spring clips 61. As shown in the embodiment depicted in FIG. 2A, spring clips 61 are spring operated to contact the inner surface of walls 42 to effect a resilient engagement with walls 42. Optionally, spring clips 61 may contain one or more protrusions 61a on the outer surface to strengthen the resilient connection. Spring clips 61 can be made of any strong resilient material, such as metals or hard plastics. Preferably, spring clips 61 are made of any suitable resilient material, and more preferably made of steel. Further, optional protrusions 61a may engage corresponding notches (not shown) in the inner surface of walls 42 to perfect a latching engagement. Alternatively, protrusions 61a may work to add extra spring force against a flush inner surface of walls 42 to perfect a resilient engagement. The resilient engagement secures access door 50 when placed in a closed "in service" position or closed "not in service" position. A user may then insert a finger or tool into a notch 48 to lift and open access door 50 to work against the spring force of spring clips 61. Bottom surface 52 also includes a gasket 62 positioned around all edges (57 & 58) of access door 50 designed to prevent water, other liquids, and/or debris entry into floor box assembly 10. Gasket 62 can be held in place by adhesive or by friction within a groove (not shown) on bottom surface 52.

When access door 50 is lifted, a protrusion or tab portion 49 of recessed portion 45 that extends into aperture 56 is exposed. Tab portion 49 is preferably positioned in the middle of one side of recessed portion 45. A plurality of notches 48 are positioned on the surface of recessed portion 45 corresponding with the positioning of one side edge 58 (opposite the side edge 58 with sliding hinge 55) to aid in opening access door 50. Thus, a first notch 48 (closest to edge 46) meets the positioning of side edge 58 in the closed "not in service" position shown in FIG. 1. A finger or tool can be inserted into first notch 48 and lift access door 50 by applying upward pressure on side edge 58. The access door 50 is lifted to expose aperture 56 and the harbored receptacle(s). In this open "cabling" position, shown in FIG. 2A, cords are permitted to enter the floor box assembly 10 to reach a receptacle or prior plugged cords may be adjusted, inspected, or removed. While in the "cabling" position, sliding hinge 55 of access door 50 is capable of sliding along grooves 54 to reach a second access door 50 "cabling" position (as indicated by the "slide" arrow in FIG. 2A).

Figure 2B:
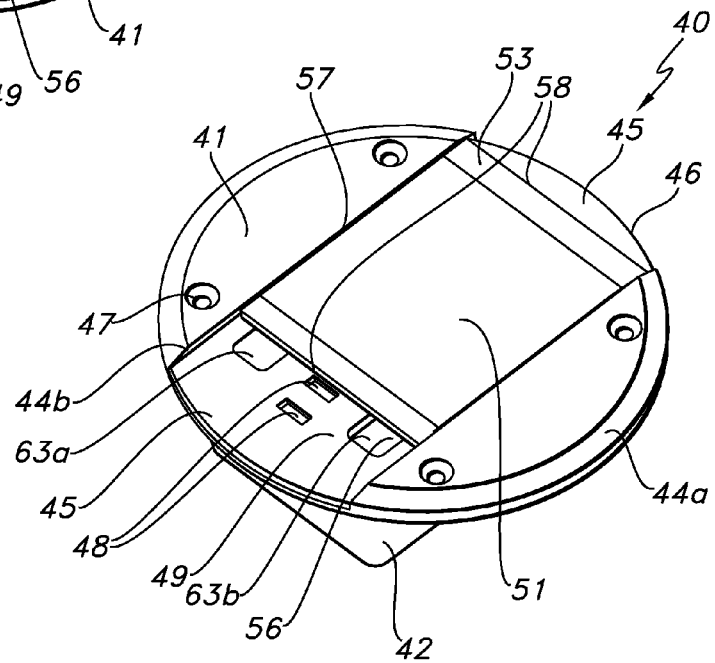
FIG. 2B is a perspective view of the cover according to the embodiment of the present invention shown in FIG. 1 with the access door in a closed "in service" position leaving two apertures 63a & 63b for cords, cables, wires, etc.

Once in a second "cabling" position, the access door 50 is lowered to engage the spring clips 61 with walls 42, as shown in FIG. 2B. This closed "in service" position reveals cord ports 63a & 63b, through which cords may be placed allowing the access door 50 to remain shut and secured while cords are plugged into a receptacle in floor box assembly 10. Access door 50, thus, may be positioned in a plurality of closed positions that cover all or a portion of aperture 56. When covering a portion of aperture 56, at least one of cord ports 63a & 63b is revealed. The size of a cord port 63 may depend on how far sliding hinge 55 is slid along grooves 54. In some embodiments, a cord port 63 is designed to have a pre-determined size by including a stop mechanism to secure access door 50 in a particular closed "in service" position (note, a stop mechanism may also work to secure the access door 50 in a particular closed "not in service" position). A stop mechanism is usually comprised of at least one element on the cover plate and the access door that work in concert together to better secure the access door in a closed position. Another advantage of a stop mechanism is to protect cords in a closed "in use" position by preventing access door 50 from slipping or otherwise being slid onto the cords protruding through cord port 63. One such stop mechanism may be accomplished by utilizing protrusions 155 on access door with corresponding notches 154 in top surface 143 (see embodiment shown in FIGS. 3A & 3C), which results in the access door remaining secured in one of a plurality of pre-set closed positions. Another stop mechanism may be accomplished by utilizing latch members 264 and latch stopper 247 in latch receiving groove 246 (see embodiment shown in FIGS. 4A & 4C). A further stop mechanism may be accomplished by utilizing self-alignment pins 371 and pin stoppers 372 (see embodiment shown in FIG. 5C). A still further stop mechanism may be accomplished by utilizing optional protrusions 61a on spring clips 61 and corresponding notches (not shown) in the inner surface of walls 42. A still further stop mechanism (not shown) may be accomplished by utilizing an optional protrusion on access door side edge 58 (nearest notches 48) that corresponds and fits into notches 48 (or a portion thereof) in recessed portion 45. Other locking or stop mechanisms may be used as known in the field, such as turning locks and sliding latches (see, e.g., U.S. Pat. No. 8,357,852 to Drane, incorporated herein by reference in its entirety).

Now referring to FIGS. 3A-3C, another embodiment of the present invention is depicted. The cover assembly 140 is comprised of at least cover plate 141 and removable and repositionable access door 150. Cover assembly 140 can be made of any metal or plastic material known in the art. Preferably, cover assembly 140 is made of steel, brass, aluminum, or polycarbonate reinforced with a steel plate. In FIG. 3A, cover assembly 140 is shown with the access door 150 in a closed "not in service" position, meaning that no cords are plugged into an outlet of a receptacle, such as receptacle 31. When in the closed "not in service" position, cover assembly 140 is water resistant and prevents dust and debris from entering the assembly. Cover plate 141 may include exposed fastener holes 147 for attachment of cover plate 141 to another object, for example a floor structure. Any acceptable fastener device may be used. As shown in FIGS. 3A-3C, fastener holes 147 are configured for a countersunk screw or bolt (not shown) to maintain a substantially flat surface of cover assembly 140. Cover plate 141 may be configured in any size or shape as necessary according to the functional or aesthetic needs of a consumer. As shown in FIGS. 3A-3C, cover plate 141 is provided in a round shape, but other shapes are within the scope and spirit of the present invention. Also, cover plate 141 may be configured to have recessed walls (flange) 142 surrounding all sides and extending downward. Recessed walls 142 may be configured to maintain a desired depth for a receptacle or recessed box assembly. Recessed walls 142 terminate at an opening at one end to expose a receptacle, such as receptacle 31, and at the other end as aperture 156 (see FIG. 3B).

Cover plate 141 has a planar top surface 143 that is substantially flat to minimize tripping or furniture becoming obstructed by cover assembly 140. Alternatively, top surface 143 may be configured to have a recessed top surface (not shown) for receiving flooring material to match or coordinate with its installation location. Fastener holes 147 may be positioned on top surface 143, as shown in FIGS. 3A-3C, or located elsewhere on cover plate 141. To further minimize tripping or furniture becoming obstructed by cover assembly 140, top surface 143 has outward facing edges 144a that are preferably tapered, beveled, or rounded. Cover plate 141 further has a channel or recessed portion 145 (in relation to top surface 143) in which access door 150 is positioned. Recessed portion 145 is designed to be just wider than access door 150 so that only a minimal amount of space will exist between access door 150 side edges 157 and top surface 143 side edges 144b. The outward facing edges 146 of recessed portion 145 may similarly be rounded, tapered, or beveled.

Access door 150 has a planar top surface 151 that is substantially flat to minimize tripping or furniture becoming obstructed by cover assembly 140. Alternatively, top surface 151 may be configured to have a recessed top surface (not shown) for receiving flooring material to match or coordinate with its installation location. Now referring to FIG. 3B, access door 150 has side edges 157 that face toward side edges 144b of top surface 143, and side edges 158 that face toward recessed portion 145. Edges 144b of top surface 143 are designed to be substantially the same height as top surface 151 alongside edges 157, so that top surface 143 and top surface 151 are flush. The end portions 153 of top surface 151 near side edges 158 are preferably tapered, beveled, or rounded to minimize tripping or furniture becoming obstructed by cover assembly 140. Also, in this embodiment, access door 150 has an extension portion 164. Extension portion 164 allows for larger cord ports 163 or a smaller tab portion 149 of recessed portion 145.

Side edges 157 include a pair of protrusions 155 as a stop mechanism. Protrusions 155 are designed to fit into pairs of dimples or notches 154a & 154b located in top surface 143 along edges 144b, thereby securing access door 150 in one position (e.g., closed "not in service" as shown in FIG. 3A) by preventing access door 150 from sliding into another position (e.g., closed "in service" as shown in FIG. 3C). While a pair of protrusions 155 is preferable, some embodiments may have a single protrusion on one side edge 157 with corresponding single notches 154a & 154b along a single corresponding side edge 144b. Some embodiments may have more than two pair of notches 154a & 154b to allow for more than two closed positions, especially if graduated closed "in service" positions are desirable (i.e., only one cord port 163 is open in one closed "in service" position, while two cord ports 163 are available in a second closed "in service" position).

In FIG. 3B, there is shown the bottom surface 152 of access door 150. Bottom surface 152 includes securing apparatus, such as access door lock bracket 159. Access door lock bracket 159 is attached to bottom surface 152 by fasteners, which may include screws, bolts, rivets, or similar fasteners (not shown) corresponding to holes 160. Access door lock bracket 159 includes a pair of opposite facing securing members 161. Securing members 161 may be made of any resilient material such as rubber or suitable plastics. Preferably, securing members 161 are made of resilient plastic. As shown in the embodiment depicted in FIG. 3B, securing members 161 include protrusions 161a that are configured to effect a resilient engagement with walls 142, thereby securing the access door 150 in a closed position by exerting force against a flush inner surface of wall 142. A user may then insert a finger or tool into a notch 148 to lift and open access door 150 to work against the exerted force of securing members 161 and protrusions 161a. As shown in FIG. 3B, this embodiment does not include a sliding hinge and corresponding groove. To keep access door 150 from being misplaced and/or to limit its usable positioning, access door 150 is attached to cover plate 141 by tether 165. Access door attachment end 167 of tether 165 is attached to bottom surface 152 by adhesive or fasteners, which may include screws, bolts, rivets, or similar fasteners (not shown) corresponding to some or all of holes 160. Plate attachment end 166 of tether 165 is attached to an inner surface of walls 142 by adhesive, fastener, or other suitable attachment means. Tether 165 may be made of any strong but flexible material, for example leather, flexible rubber, neoprene, or suitable plastics. Bottom surface 152 also includes a gasket 162 positioned around all edges (157 & 158) of access door 150 designed to prevent water, other liquids, and/or debris entry into floor box assembly 10. Gasket 162 can be held in place by adhesive or by friction within a groove (not shown) on bottom surface 152.

When access door 150 is lifted, a protrusion or tab portion 149 of recessed portion 145 that extends into aperture 156 is exposed. Tab portion 149 is preferably positioned in the middle of one side of recessed portion 145. Extension portion 164 lies on top of tab portion 149 when in the closed "not in service" position. As mentioned above, extension portion 164 allows for larger cord ports 163 or a smaller tab portion 149 of recessed portion 145. A plurality of notches 148 are positioned on the surface of recessed portion 145 corresponding with the positioning of one side edge 158 (on extension portion 164) to aid in opening access door 150. Thus, a first notch 148 (closest to edge 146) meets the positioning of side edge 158 on extension portion 164 in the closed "not in service" position shown in FIG. 3A. A finger or tool can be inserted into first notch 148 and lift access door 150 by applying upward pressure on side edge 158.

The access door 150 is lifted to expose aperture 156 and the harbored receptacle(s). In this open "cabling" position, shown in FIG. 3B, cords are permitted to enter the floor box assembly 10 to reach a receptacle or prior plugged cords may be adjusted, inspected, or removed. While in the "cabling" position, a user may slide or position access door 150 along recessed portion 145 and edges 144b to ready access door 150 to be placed in a closed "in service" position (as indicated by the straight arrow in FIG. 3B). As noted above, access door 150 is limited in its movement by tether 165.

The access door 150 is lowered to engage securing members 161 and protrusions 161a with walls 142, as shown in FIG. 3C. This closed "in service" position reveals cord ports 163a & 163b, through which cords may be placed allowing the access door 150 to remain shut and secured while cords are plugged into a receptacle in floor box assembly 10. Access door 150, thus, may be positioned in a plurality of closed positions that cover all or a portion of aperture 156. When covering a portion of aperture 156, at least one of cord ports 163a & 163b is revealed. The size of a cord port 163 may depend on the positioning of protrusions 155 in notches 154a & 154b along edge 144b. In the embodiment shown in FIGS. 3A-3C, cord ports 163a & 163b are designed to have a pre-determined size by including a stop mechanism (154a & 154b plus 155) to secure access door 150 in a particular closed "in service" position (note, a stop mechanism also works to secure the access door 150 in a particular closed "not in service" position). Another advantage of a stop mechanism is to protect cords in a closed "in use" position by preventing access door 150 from slipping or otherwise being moved onto the cords protruding through cord ports 163a & 163b. As discussed above, other stop mechanisms are contemplated within the spirit and scope of the present invention.

Figure 4A:
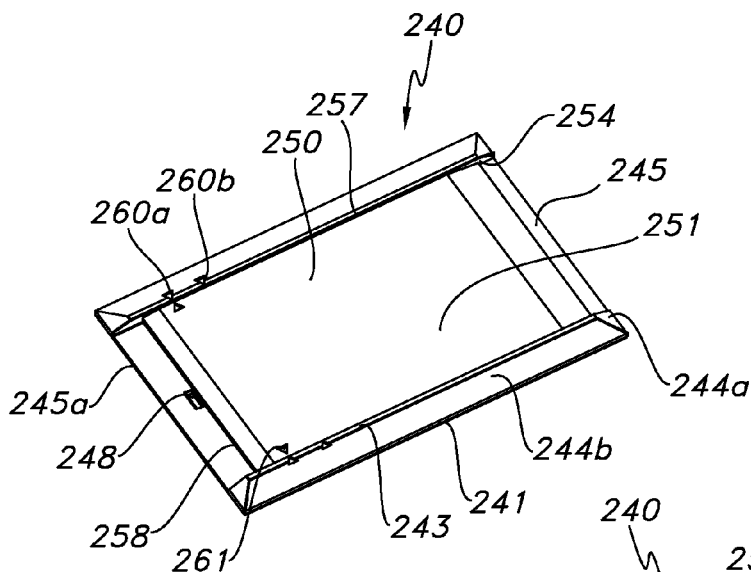
FIG. 4A is a perspective view of the cover assembly according to another embodiment of the present invention with the access door in a closed "not in service" position.
Figure 4B:
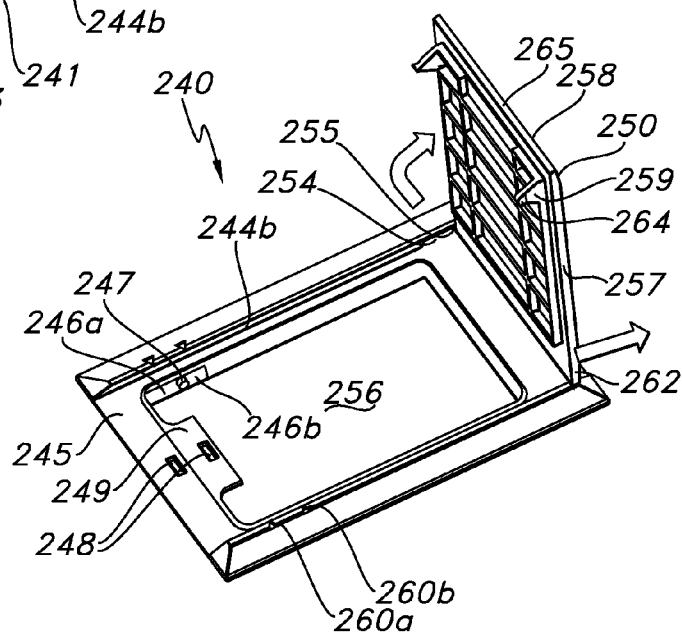
FIG. 4B is a perspective view of the cover according to the embodiment of the present invention shown in FIG. 4A with the access door open.
Figure 4C:
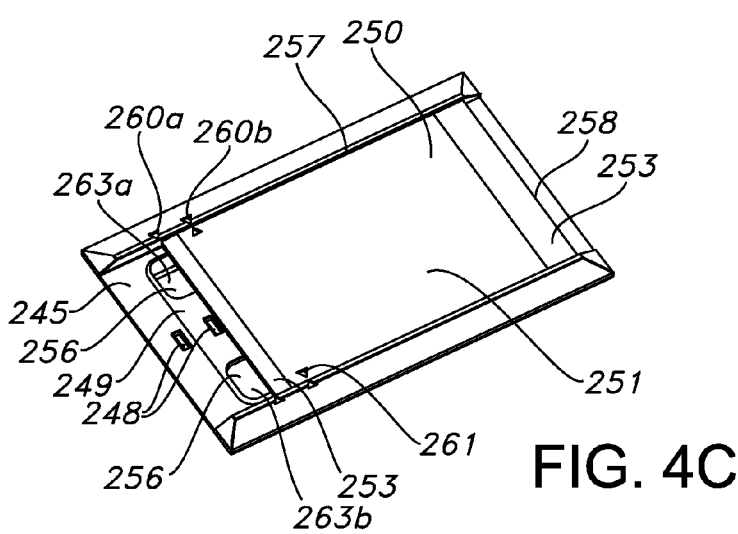
FIG. 4C is a perspective view of the cover according to the embodiment of the present invention shown in FIG. 4A with the access door in a closed "in service" position leaving two apertures 263a & 263b for cords, cables, wires, etc.

Now referring to FIGS. 4A-4C, a further embodiment of the present invention is depicted. The cover assembly 240 is comprised of at least cover plate 241 and repositionable access door 250. Cover assembly 240 can be made of any metal or plastic material known in the art. Preferably, cover assembly 240 is made of steel, brass, aluminum, or polycarbonate reinforced with a steel plate. In FIG. 4A, cover assembly 240 is shown with the access door 250 in a closed "not in service" position, meaning that no cords are plugged into an outlet of a receptacle, such as receptacle 31. When in the closed "not in service" position, cover assembly 240 is water resistant and prevents dust and debris from entering the assembly. Cover plate 241 may include exposed fastener holes for attachment of cover plate 241 to another object, for example a floor structure. Alternatively, cover plate 241 may be attached to another object, for example a floor structure, by utilizing hidden fastener holes (not shown) on the underneath side of cover plate 241. Any acceptable fastener device may be used. Cover plate 241 may be configured in any size or shape as necessary according to the functional or aesthetic needs of a consumer. As shown in FIGS. 4A-4C, cover plate 241 is provided in a rectangular shape, but other shapes are within the scope and spirit of the present invention. Also, cover plate 241 may be configured to have recessed walls (flange, not shown) surrounding all sides and extending downward or flush walls 242. Walls 242 may be configured to maintain a desired depth for a receptacle or recessed box assembly, or, as shown in FIG. 4B, to be flush with a mounting site of a floor structure (i.e., the cover plate 241 rests on the floor structure and does not extend downward into the floor at the mounting site). Walls 242 terminate at an opening at one end to expose a receptacle, such as receptacle 31, and at the other end as aperture 256 (see FIG. 4B).

Cover plate 241 has a planar top surface 243 that is substantially flat to minimize tripping or furniture becoming obstructed by cover assembly 240. As shown in FIG. 4A, top surface 243 is very small in this embodiment, as the majority of the top surface of cover assembly 240 is dominated by the access door 250. Alternatively, in embodiments with a larger top surface 243, this feature may be configured to have a recessed top surface (not shown) for receiving flooring material to match or coordinate with its installation location. To further minimize tripping or furniture becoming obstructed by cover assembly 240, top surface 243 has outward facing edges 244a that are preferably tapered, beveled, or rounded on all sides. Cover plate 241 further has a channel or recessed portion 245 (in relation to top surface 243) in which access door 250 is positioned. Recessed portion 245 is designed to be just wider than access door 250 so that only a minimal amount of space will exist between access door 250 side edges 257 and top surface 243 side edges 244b. The outward facing edges 245a of recessed portion 245 may similarly be rounded, tapered, or beveled (not shown).

Access door 250 has a planar top surface 251 that is substantially flat to minimize tripping or furniture becoming obstructed by cover assembly 240. Alternatively, top surface 251 may be configured to have a recessed top surface (not shown) for receiving flooring material to match or coordinate with its installation location. As shown in FIG. 4B, access door 250 has side edges 257 that face toward side edges 244b of top surface 243, and side edges 258 that face toward recessed portion 245. Edges 244b of top surface 243 are designed to be the same height as top surface 251 alongside edges 257, so that top surface 243 and top surface 251 are flush. The end portions 253 of top surface 251 near side edges 258 are preferably tapered, beveled, or rounded to minimize tripping or furniture becoming obstructed by cover assembly 240. Also, in this embodiment, top surface 251 has a pair of alignment or position indicator marks 261 alongside edges 257. Marks 261 correspond to a plurality of alignment or position indicator marks 260a & 260b on top surface 243. The corresponding marks (261 and 260a & 260b) indicate that access door 250 is in one of two closed positions, as shown in FIGS. 4A & 4C. In this embodiment, when marks 261 line up with marks 260a, the access door 250 is in the closed "not in service" position (see FIG. 4A). In this embodiment, when marks 261 line up with marks 260b, the access door 250 is in the closed "in service position" (see FIG. 4C). In other embodiments, more than two closed positions can be indicated with additional marks (not shown), such as a graduated configuration (i.e., only one cord port 263 is open in one closed "in service" position, while two cord ports 263 are available in a second closed "in service" position).

In FIG. 4B, there is shown the bottom surface 252 of access door 250. Bottom surface 252 includes securing apparatus, such as alignment pins 259. Alignment pins 259 are attached to bottom surface 252 by fasteners, which may include screws, bolts, rivets, or similar fasteners (not shown). Alternatively, and as shown in FIG. 4B, alignment pins 259 are a molded feature of bottom surface 252. Alignment pins 259 include a pair of opposite facing latch (protrusion) members 264 located at its ends. Bottom surface 252 also includes a gasket 262 positioned around all edges (257 & 258) of access door 250 designed to prevent water, other liquids, and/or debris entry into floor box assembly 10. Gasket 262 can be held in place by adhesive or by friction within a groove (not shown) on bottom surface 252.

As shown in the embodiment depicted in FIG. 4B, latch members 264 are configured to correspond to a slot or groove or series of slots or grooves 246a & 246b in the inner surface of walls 242, thereby securing the access door 250 in a closed position by resilient engagement. Grooves 246a & 246b contain stop mechanism (stopper 247 plus 264), discussed below. The resilient engagement secures access door 250 when placed in a closed "in service" position or closed "not in service" position. A user may then insert a finger or tool into a notch 248 and/or corresponding notch 265 to lift and open access door 250 to work against the resilient engagement of latch members 264 and grooves 246a & 246b. At one end of access door 250, positioned on either side of the junction of edges 244b and recessed portion 245, a pair of slots or grooves 254 is configured for receiving attachment portion or sliding hinge 255 of access door 250 to pivotally mount access door 250 to cover plate 241. As shown in the embodiment in FIG. 4B, sliding hinge 255 consists of two extension portions (one on either side of access door 250 corresponding to grooves 254) on side edges 257 near side edge 258 opposite the plurality of notches 248.

When access door 250 is lifted, a protrusion or tab portion 249 of recessed portion 245 that extends into aperture 256 is exposed. Tab portion 249 is preferably positioned in the middle of one side of recessed portion 245. A plurality of notches 248 are positioned on the surface of recessed portion 245 corresponding with the positioning of one side edge 258 (opposite sliding hinge 255) to aid in opening access door 250. Thus, a first notch 248 (closest to edge 245a) meets the positioning of side edge 258 and notch 265 in the closed "not in service" position shown in FIG. 4A. In the closed "not in service" position, latch members 264 is matched with grooves 246a. A finger or tool can be inserted into first notch 248 and/or notch 265 to lift access door 250 by applying upward pressure on side edge 258. The access door 250 is lifted to expose aperture 256 and the harbored receptacle(s). In this open "cabling" position, shown in FIG. 4B, cords are permitted to enter the floor box assembly 10 to reach a receptacle or prior plugged cords may be adjusted, inspected, or removed. While in the "cabling" position, sliding hinge 255 of access door 250 is capable of sliding along grooves 254 to reach a second access door 250 "cabling" position (as indicated by the "slide" arrow in FIG. 4B).

Once in a second "cabling" position, the access door 250 is lowered to engage alignment pins 259 and latch members 264 with latch receiving grooves 246b, as shown in FIG. 4C. This closed "in service" position reveals cord ports 263a & 263b, through which cords may be placed allowing the access door 250 to remain shut and secured while cords are plugged into a receptacle in floor box assembly 10. Access door 250, thus, may be positioned in a plurality of closed positions that cover all or a portion of aperture 256. When covering a portion of aperture 256, at least one of cord ports 263a & 263b is revealed. The size of a cord port 263 may depend on the positioning of sliding hinge 255 and a stop mechanism (e.g., latch stopper 247 that separates or divides grooves 246a & 246b that prevents latch members 264 from moving further in grooves 246a & 246b). In the embodiment shown in FIGS. 4A-4C, cord ports 263a & 263b are designed to have a pre-set size as determined by stopper 247 to secure access door 250 in a particular closed "in service" position (note, a stop mechanism also works to secure the access door 250 in a particular closed "not in service" position as shown in FIG. 4A). Latch stopper 247 divides grooves 246a & 246b, thereby preventing sliding hinge 255 from sliding beyond a certain point. Although only one latch stopper 247 is provided in the embodiment shown in FIG. 4B, multiple latch stoppers 247 may be provided in a graduated configuration (not shown). Another advantage of a stop mechanism is to protect cords in a closed "in use" position by preventing access door 250 from slipping or otherwise being slid onto the cords protruding through cord ports 263a & 263b. As discussed above, other stop mechanisms are contemplated within the spirit and scope of the present invention.

Figure 5A:
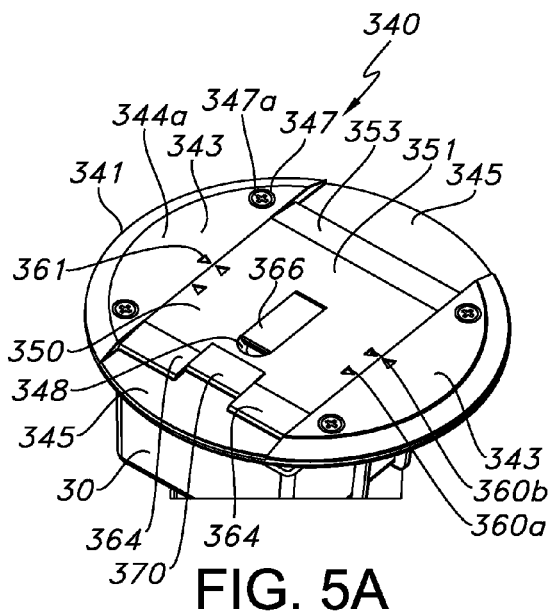
FIG. 5A is a perspective view of the cover assembly according to yet another embodiment of the present invention with the access door in a closed "not in service" position and a pull lever 366 disposed in the top surface 351 of access door 350.
Figure 5B:
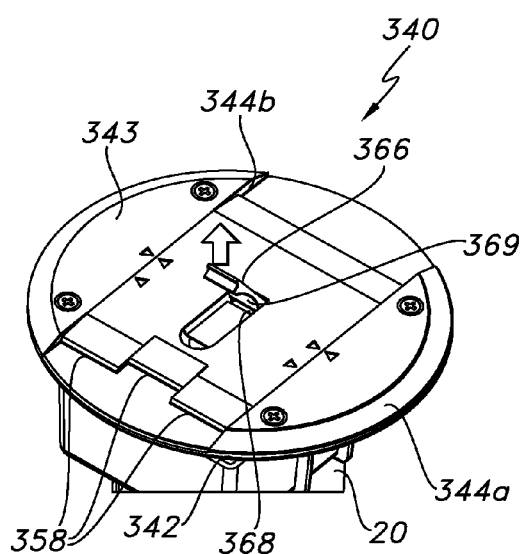
FIG. 5B is a perspective view of the cover according to the embodiment of the present invention shown in FIG. 5A with the access door in a closed "not in service" position and a pull lever 366 lifted at approximately 45 degrees.

Now referring to FIGS. 5A-5D, a further embodiment of the present invention is depicted. The cover assembly 340 is comprised of at least cover plate 341 and removable and repositionable access door 350. Cover assembly 340 can be made of any metal or plastic material known in the art. Preferably, cover assembly 340 is made of steel, brass, aluminum, or polycarbonate reinforced with a steel plate. In FIGS. 5A & 5B, cover assembly 340 is shown with the access door 350 in a closed "not in service" position, meaning that no cords are plugged into an outlet of a receptacle, such as receptacle 31. When in the closed "not in service" position, cover assembly 340 is water resistant and prevents dust and debris from entering the assembly. Cover plate 341 may include exposed fastener holes 347 for attachment of cover plate 341 to another object, for example a floor structure. Any acceptable fastener device may be used. As shown in FIGS. 5A-5D, fastener holes 347 are configured for a countersunk screw or bolt 347a to maintain a substantially flat surface of cover assembly 340. Cover plate 341 may be configured in any size or shape as necessary according to the functional or aesthetic needs of a consumer. As shown in FIGS. 5A-5D, cover plate 341 is provided in a round shape, but other shapes are within the scope and spirit of the present invention. Also, cover plate 341 may be configured to have recessed walls (flange) 342 surrounding all sides and extending downward toward recessed box assembly 30. Recessed walls 342 may be configured to maintain a desired depth for a receptacle or recessed box assembly. Recessed walls 342 terminate at an opening at one end to expose a receptacle, such as receptacle 31, and at the other end as aperture 356 (see FIG. 5C).

Cover plate 341 has a planar top surface 343 that is substantially flat to minimize tripping or furniture becoming obstructed by cover assembly 340. Alternatively, top surface 343 may be configured to have a recessed top surface (not shown) for receiving flooring material to match or coordinate with its installation location. Fastener holes 347 may be positioned on top surface 343, as shown in FIGS. 5A-5D, or located elsewhere on cover plate 341. To further minimize tripping or furniture becoming obstructed by cover assembly 340, top surface 343 has outward facing edges 344a that are preferably tapered, beveled, or rounded. Cover plate 341 further has a channel or recessed portion 345 (in relation to top surface 343) in which access door 350 is positioned. Recessed portion 345 is designed to be just wider than access door 350 so that only a minimal amount of space will exist between access door 350 side edges 357 and top surface 343 side edges 344b. The outward facing edges 346 of recessed portion 345 may similarly be rounded, tapered, or beveled.

Figure 5C:
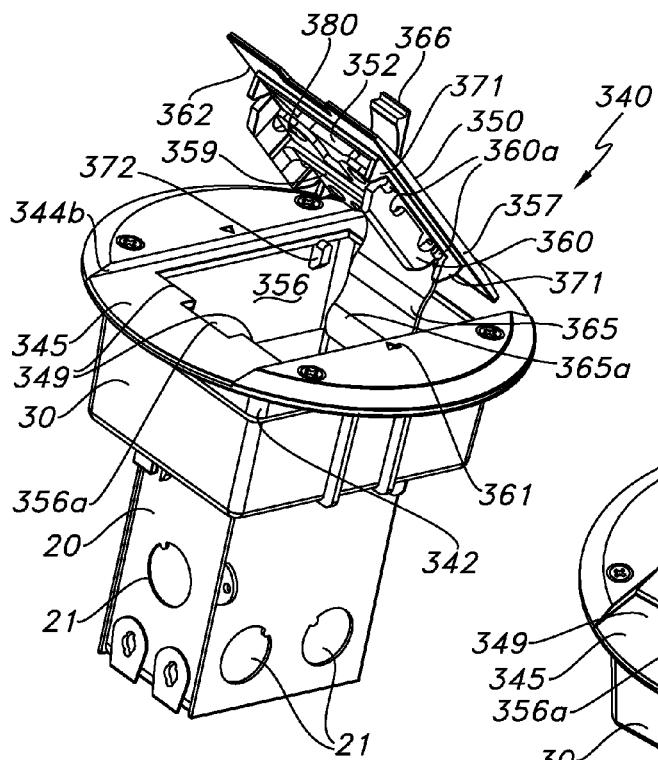
FIG. 5C is a perspective view of the cover according to the embodiment of the present invention shown in FIG. 5A with the access door open.
Figure 5D:
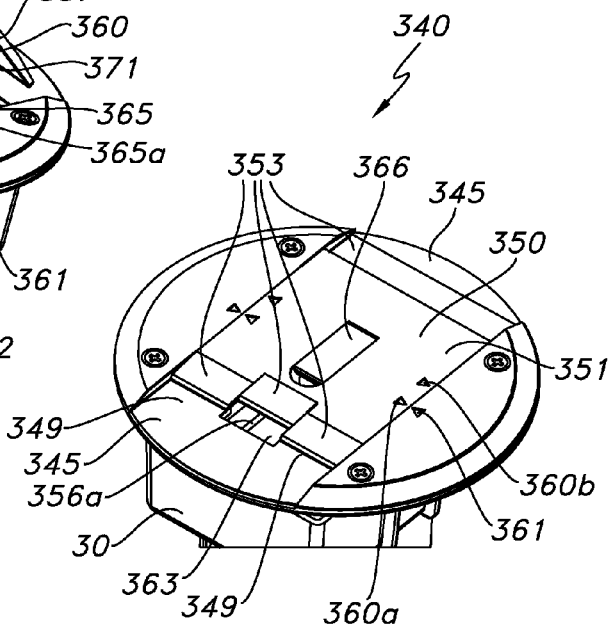
FIG. 5D is a perspective view of the cover according to the embodiment of the present invention shown in FIG. 5A with the access door in a closed "in service" position leaving one aperture 363 for cords, cables, wires, etc.

Access door 350 has a planar top surface 351 that is substantially flat to minimize tripping or furniture becoming obstructed by cover assembly 340. Alternatively, top surface 351 may be configured to have a recessed top surface (not shown) for receiving flooring material to match or coordinate with its installation location. As shown in FIGS. 5B & 5C, access door 350 has side edges 357 that face toward side edges 344b of top surface 343, and side edges 358 that face toward recessed portion 345. Edges 344b of top surface 343 are designed to be the same height as top surface 351 alongside edges 357, so that top surface 343 and top surface 351 are flush. The end portions 353 of top surface 351 near side edges 358 are preferably tapered, beveled, or rounded to minimize tripping or furniture becoming obstructed by cover assembly 340. Also, in this embodiment, top surface 351 has a plurality of alignment or position indicator marks 360b & 360c alongside edges 357. Marks 360b & 360c correspond to a pair of alignment or position indicator marks 361 on top surface 343. The corresponding marks (360b & 360c and 361) indicate that access door 350 is in one of two closed positions, as shown in FIGS. 5A & 5D. In this embodiment, when marks 361 line up with marks 360b, the access door 350 is in the closed "not in service" position (see FIGS. 5A & 5B). In this embodiment, when marks 361 lines up with marks 360c, the access door 350 is in the closed "in service position" (see FIG. 5D). In other embodiments, more than two closed positions can be indicated with additional marks (not shown), such as a graduated configuration (i.e., only one cord port 363 is open in one closed "in service" position, while two cord ports 363 are available in a second closed "in service" position). Also, in this embodiment, access door 350 has two extension portions 364 flanking an access door indentation portion 370. Extension portions 364 and access door indentation portion 370 allow for a larger cord port 363 or a smaller tab portion 349 of recessed portion 345.

In FIG. 5C, there is shown the bottom surface 352 of access door 350. Bottom surface 352 includes securing apparatus, such as access door lock bracket 359. Access door lock bracket 359 is attached to bottom surface 352 by fasteners, which may include screws, bolts, rivets, or similar fasteners (not shown) corresponding to holes 380. Access door lock bracket 359 includes a pair of opposite facing securing members 360. Securing members 360 may be made of any resilient material such as rubber or suitable plastics. Preferably, securing members 360 are made of resilient plastic. As shown in the embodiment depicted in FIG. 5C, securing members 360 include protrusions 360a that are configured to effect a resilient engagement with walls 342, thereby securing the access door 350 in a closed position by exerting force against a flush inner surface of wall 342. Notch 348 is disposed in top surface 351 and designed for a user to insert a finger into it and to lift on pull lever 366 disposed in top surface 351, thereby causing pull lever 366 to lift up, preferably in an arc that is less than 90° and more preferably 45°, exposing an underside 369, as shown in FIGS. 5B-5C. Underside 369 is preferably arch-shaped to provide the user with a "handle" for better pulling ability. By pulling up on pull lever 366, access door 350 is opened by working against the exerted force of securing members 360 and protrusions 360a. Pull lever 366 is pivotally hinged to access door 350 by hinge member 368. Pull lever 366 may optionally include a spring member (not shown) to resiliently maintain pull lever 366 in the lowered, flush position, as shown in FIGS. 5A & 5D, when not being actively pulled. Alternatively, gravity can be utilized to maintain pull lever 366 in the lowered, flush position when not being actively pulled.

As shown in FIGS. 5B & 5C, this embodiment does not include a sliding hinge and corresponding groove. To keep access door 350 from being misplaced and/or to limit its usable positioning, access door 350 is attached to cover plate 341 by tether 365. Access door attachment end 365b of tether 365 is attached to bottom surface 352 by adhesive or fasteners, which may include screws, bolts, rivets, or similar fasteners (not shown) corresponding to some or all of holes 380. Plate attachment end 365a of tether 365 is attached to an inner surface of walls 342 by adhesive, fastener, or other suitable attachment means. Tether 365 may be made of any strong but flexible material, for example leather, flexible rubber, neoprene, or suitable plastics. Bottom surface 352 also includes a gasket 362 positioned around all edges (357 & 358) of access door 350 designed to prevent water, other liquids, and/or debris entry into floor box assembly 10. Gasket 362 can be held in place by adhesive or by friction within a groove (not shown) on bottom surface 352.

As shown in the embodiment depicted in FIG. 5C, bottom surface 352 also includes a plurality of self-alignment pins 371 protruding down toward aperture 356. Self-alignment pins 371 are configured to correspond to a plurality of pin stoppers 372 positioned on the inner surface of walls 342. Self-alignment pins 371 and pin stoppers 372 together operate as a stop mechanism, discussed further below.

When access door 350 is lifted, protrusions or tab portions 349 of recessed portion 345 that extend into aperture 356 are exposed. Tab portions 349 are preferably positioned on the sides of recessed portion 345 nearest edges 344b, thereby creating a single extension 356a in aperture 356. In this open "cabling" position, shown in FIG. 5C, cords are permitted to enter the floor box assembly 10 to reach a receptacle or prior plugged cords may be adjusted, inspected, or removed. While in the "cabling" position, a user may slide or position access door 350 along recessed portion 345 and edges 344b to ready access door 350 to be placed in a closed "in service" position. As noted above, access door 350 is limited in its movement by tether 365.

The access door 350 is lowered to engage securing members 360 and protrusions 360a with walls 342, as shown in FIG. 5D. This closed "in service" position reveals cord port 363, through which cords may be placed allowing the access door 350 to remain shut and secured while cords are plugged into a receptacle in floor box assembly 10. Access door 350, thus, may be positioned in a plurality of closed positions that cover all or a portion of aperture 356. When covering a portion of aperture 356, at least one of cord ports 363 is revealed. The size of a cord port 363 may depend on the positioning of self-alignment pins 371 and/or pin stoppers 372. In the embodiment shown in FIGS. 5A-5D, cord port 363 is designed to have a pre-determined size by including a stop mechanism (371 plus 372) to secure access door 350 in a particular closed "in service" position (note, a stop mechanism also works to secure the access door 350 in a particular closed "not in service" position). Another advantage of a stop mechanism is to protect cords in a closed "in use" position by preventing access door 350 from slipping or otherwise being moved onto the cords protruding through cord port 363. As discussed above, other stop mechanisms are contemplated within the spirit and scope of the present invention.

Figure 6:
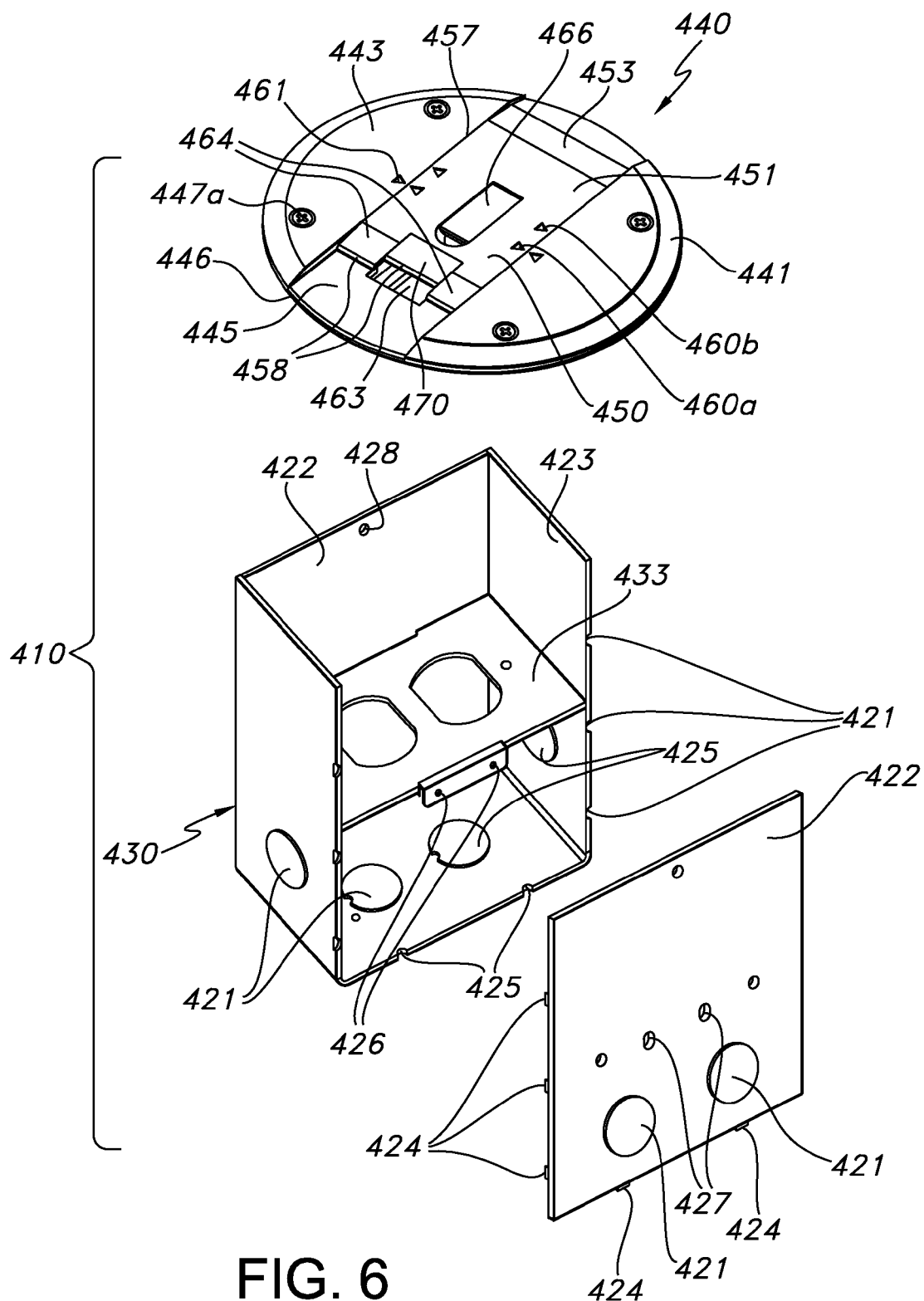
FIG. 6 a floor box assembly with integrated electrical box and recessed floor (outlet) box, and the cover assembly according to a further embodiment of the present invention with shortened recessed walls (flange) showing the access door in a closed "in service" position leaving one aperture 463 for cords, cables, wires, etc.

Now referring to FIGS. 6 and 7A-7C, a still further embodiment of the present invention is depicted. As can be appreciated in FIG. 6, the cover assembly 440 is comprised of at least cover plate 441 and removable and repositionable access door 450 (similar as shown in FIGS. 5A-5D). Cover assembly 440 can be made of any metal or plastic material known in the art. Preferably, cover assembly 440 is made of steel, brass, aluminum, or polycarbonate reinforced with a steel plate. In FIG. 6, cover assembly 440 is shown with the access door 450 in a closed "in service" position, meaning that one or more cords may be plugged into an outlet of a receptacle, such as receptacle 31. When in the closed "not in service" position, cover assembly 440 is water resistant and prevents dust and debris from entering the assembly (see, e.g., FIG. 5A). Cover plate 441 may include exposed fastener holes 447 for attachment of cover plate 441 to another object, for example a floor structure. Any acceptable fastener device may be used. As shown in FIG. 6, fastener holes 447 are configured for a countersunk screw or bolt 447a to maintain a substantially flat surface of cover assembly 440. Cover plate 441 may be configured in any size or shape as necessary according to the functional or aesthetic needs of a consumer. As shown in FIGS. 6 and 7A-7C, cover plate 441 is provided in a round shape, but other shapes are within the scope and spirit of the present invention. Also, cover plate 441 may be configured to have recessed walls (flange) 442 surrounding all sides and extending downward toward a recessed box assembly 30, or in some embodiments an integrated box 430 (integrated electrical box and recessed floor box). Integrated box 430 may be comprised of a u-shaped body member 423 and two side body members 422, forming an open end for receiving a cover plate. Preferably, each side body members 422 is welded to body member 423 at marks 424 and 425, respectively. A receptacle supporting board 433 may be included within the integrated box 430 for supporting electrical, coax, data, or other port, and may be fastened to the integrated box 430 reversibly (e.g., by screw, bolt, or other acceptable fastener) at fastener holes 426 and 427, or permanently (e.g., by welding). Integrated box 430 may contain one or more knockout holes disposed on the lower body member 423 and/or the side body members 422.

Recessed walls 442 may be configured to maintain a desired depth for a receptacle or recessed box assembly (not shown). Alternatively, and as shown in FIG. 6, the recessed walls 442 are configured to fasten (or otherwise attached) to an integrated box 430 by any acceptable means known in the art (e.g., screws, bolts, welding, etc.). For example, a nut and bolt (not shown) can be employed to fasten cover plate 441 at fastener hole 473 (see FIG. 7C) to integrated box 430 at fastener hole 428. Recessed walls 442 terminate at an opening at one end to expose a receptacle, such as receptacle 31, which can be held to supporting board 433 shown in FIG. 6, and at the other end as aperture 456 (see FIGS. 7A & 7C).

Cover plate 441 has a planar top surface 443 that is substantially flat to minimize tripping or furniture becoming obstructed by cover assembly 440. Alternatively, top surface 443 may be configured to have a recessed top surface (not shown) for receiving flooring material to match or coordinate with its installation location. Fastener holes 447 may be positioned on top surface 443, as shown in FIGS. 6 & 7A, or located elsewhere on cover plate 441. To further minimize tripping or furniture becoming obstructed by cover assembly 440, top surface 443 has outward facing edges 444a that are preferably tapered, beveled, or rounded. Cover plate 441 further has a channel or recessed portion 445 (in relation to top surface 443) in which access door 450 is positioned. Recessed portion 445 is designed to be just wider than access door 450 so that only a minimal amount of space will exist between access door 450 side edges 457 and top surface 443 side edges 444b. The outward facing edges 446 of recessed portion 445 may similarly be rounded, tapered, or beveled.

Access door 450 has a planar top surface 451 that is substantially flat to minimize tripping or furniture becoming obstructed by cover assembly 440. Alternatively, top surface 451 may be configured to have a recessed top surface (not shown) for receiving flooring material to match or coordinate with its installation location. As shown in FIGS. 6 & 7C, access door 450 has side edges 457 that face toward side edges 444b of top surface 443, and side edges 458 that face toward recessed portion 445. Edges 444b of top surface 443 are designed to be substantially the same height as top surface 451 alongside edges 457, so that top surface 443 and top surface 451 are flush. The end portions 453 of top surface 451 near side edges 458 are preferably tapered, beveled, or rounded to minimize tripping or furniture becoming obstructed by cover assembly 440. Also, in this embodiment, top surface 451 has a plurality of alignment or position indicator marks 460a & 460b alongside edges 457. Marks 460a & 460b correspond to a pair of alignment or position indicator marks 461 on top surface 443. The corresponding marks (460a & 460b and 461) indicate that access door 450 is in one of two closed positions, (see FIGS. 5A & 6). In this embodiment, when marks 461 line up with marks 460b, the access door 450 is in the closed "not in service" position (see FIG. 5A). In this embodiment, when marks 461 lines up with marks 460a, the access door 450 is in the closed "in service position" (see FIG. 6). In other embodiments, more than two closed positions can be indicated with additional marks (not shown), such as a graduated configuration (i.e., only one cord port 463 is open in one closed "in service" position, while two cord ports 463 are available in a second closed "in service" position). Also, in this embodiment, access door 450 has two extension portions 464 flanking an access door indentation portion 470. Extension portions 464 and access door indentation portion 470 allow for a larger cord port 463 or a smaller tab portion 449 of recessed portion 445.

In FIG. 5C, there is shown the bottom surface 352 of access door 350, which is compatible with the embodiment shown in FIGS. 6 & 7A-7C (see description above for details). The main difference between the access door 450 (shown in FIG. 6) and access door 350 (shown in FIG. 5C) is that the tether 465 (not shown) may be shorter due to the shortened recessed walls 442 and proximity to the attachment holes 474 therein for attaching the tether 465 to the cover plate 441. Access door lock bracket 459 includes a pair of opposite facing securing members 460, and securing members 460 may be made of any resilient material such as rubber or suitable plastics (not shown, see FIG. 5C for details). Preferably, securing members 460 are made of resilient plastic. Securing members 460 include protrusions 460c that are configured to effect a resilient engagement with walls 442, thereby securing the access door 450 in a closed position by exerting force against a flush inner surface of wall 442 (not shown, see FIG. 5C for details).

Notch 448 is disposed in top surface 451 and designed for a user to insert a finger into it and to lift on pull lever 466 disposed in top surface 451, thereby causing pull lever 466 to lift up, preferably in an arc that is less than 90° and more preferably 45° (see FIG. 6). Underside 469 is preferably arch-shaped to provide the user with a "handle" for better pulling ability. By pulling up on pull lever 466, access door 450 is opened by working against the exerted force of securing members 460 and protrusions 460c. Pull lever 466 is pivotally hinged to access door 450 by hinge member 468 (not shown, see FIG. 5C for details). Pull lever 466 may optionally include a spring member (not shown) to resiliently maintain pull lever 466 in the lowered, flush position, as shown in FIG. 6, when not being actively pulled. Alternatively, gravity can be utilized to maintain pull lever 466 in the lowered, flush position when not being actively pulled.

Similar to the embodiment shown in FIG. 5C, the embodiment shown in FIG. 6 does not include a sliding hinge and corresponding groove. To keep access door 450 from being misplaced and/or to limit its usable positioning, access door 450 is attached to cover plate 441 by tether 465 (not shown) at the attachment holes 474. Alternatively, access door 451 tether 465 may be attached to a recessed wall 442 by adhesive. Tether 465 may be made of any strong but flexible material, for example leather, flexible rubber, neoprene, or suitable plastics (not shown). Bottom surface 452 also includes a gasket 462 (not shown, see FIG. 5C for details) positioned around all edges (457 & 458) of access door 450 designed to prevent water, other liquids, and/or debris entry into floor box assembly 410. Gasket 462 can be held in place by adhesive or by friction within a groove (not shown) on bottom surface 452.

The embodiment depicted in FIGS. 6 & 7A-7C, bottom surface 452 also includes a plurality of self-alignment pins 471 (not shown, see FIG. 5C for details) protruding down toward aperture 456. Self-alignment pins 471 (not shown) are configured to correspond to a plurality of pin stoppers 472 (see FIGS. 7A-7C) positioned on the inner surface of walls 442. Self-alignment pins 471 and pin stoppers 472 together operate as a stop mechanism, discussed further below.

When access door 450 is lifted, protrusions or tab portions 449 of recessed portion 445 that extend into aperture 456 are exposed. Tab portions 449 are preferably positioned on the sides of recessed portion 445 nearest edges 444b, thereby creating a single extension 456a in aperture 456 (see FIGS. 6, 7A, & 7C). In an open "cabling" position (see FIG. 5C for details), cords are permitted to enter the floor box assembly 410 to reach a receptacle or prior plugged cords may be adjusted, inspected, or removed. While in the "cabling" position, a user may slide or position access door 450 along recessed portion 445 and edges 444b to ready access door

450 to be placed in a closed "in service" position (shown in FIG. 6). As noted above, access door 450 is limited in its movement by tether 465.

The access door 450 is lowered to engage securing members 460 and protrusions 460c with walls 442, as shown in FIG. 6. This closed "in service" position reveals cord port 463, through which cords may be placed allowing the access door 450 to remain shut and secured while cords are plugged into a receptacle in floor box assembly 410. Access door 450, thus, may be positioned in a plurality of closed positions that cover all or a portion of aperture 456. When covering a portion of aperture 456, at least one of cord ports 463 is revealed. The size of a cord port 463 may depend on the positioning of self-alignment pins 471 and/or pin stoppers 472. In the embodiment shown in FIGS. 6 & 7A-7C, cord port 463 is designed to have a pre-determined size by including a stop mechanism (471 plus 472) to secure access door 450 in a particular closed "in service" position (note, a stop mechanism also works to secure the access door 450 in a particular closed "not in service" position). Another advantage of a stop mechanism is to protect cords in a closed "in use" position by preventing access door 450 from slipping or otherwise being moved onto the cords protruding through cord port 463. As discussed above, other stop mechanisms are contemplated within the spirit and scope of the present invention.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. For example, a tab portion can be positioned on one side of the aperture resulting in a single cord port. By way of another example, the disclosed cover assemblies could be used with boxes installed in walls, furniture, or other flat surfaces. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

I claim:

1. A floor box cover assembly comprising: a cover plate having an aperture to permit access within said assembly, wherein said cover plate has a raised top surface, a recessed portion and a tab portion which projects into said aperture from a middle of said recessed portion; and a removable and repositionable access door attached to said cover plate by a tether, wherein said tether allows said access door to be positioned in a plurality of closed positions, wherein said plurality of closed positions comprises a closed not in service position that covers all of said aperture and a closed in service position that covers a portion of said aperture and wherein said access door is maintained as a substantially flat surface when positioned in each of said plurality of closed position.

2. The floor box cover assembly of claim 1, further comprising a recessed box assembly.

3. The floor box cover assembly of claim 2, wherein said cover plate and said access door each have a stop mechanism that work in concert to prevent movement of said access door while in each of said plurality of closed positions.

4. The floor box cover assembly of claim 2, wherein said access door has a securing apparatus that engages said cover plate in each of said plurality of closed positions.

5. The floor box cover assembly of claim 4, wherein said securing apparatus has protrusions.

6. The floor box cover assembly of claim 2, wherein said recessed box assembly comprises an integrated box having both electrical box and recessed floor box components.

7. The floor box cover assembly of claim 1, wherein said access door has a pull lever.

8. The floor box cover assembly of claim 1, wherein said access door has a first gasket positioned around all edges of a bottom side of said access door and a second gasket positioned around all edges of a top portion of a recessed box.

9. The floor box cover assembly of claim 1, wherein when said access door is positioned in said closed in service position at least one cord port is revealed.

10. an electrical box assembly comprising: an outlet box; an electrical box; and an electrical box cover assembly, wherein said electrical box cover assembly comprises: a cover plate having an aperture to permit access within said assembly; and an access door, wherein said access door is selected from the group consisting of a repositionable access door pivotally mounted to said cover plate by a sliding hinge, and a removable and repositionable access door attached to said cover plate by a tether, wherein said siding hinge slides to allow and said tether allows said repositionable access door and said removable and repositionable access door, respectively, to be positioned in a plurality of closed positions, wherein said plurality of closed positions comprises a closed not in service position that covers all of said aperture and a closed in service position that covers a portion of said aperture; and wherein said repositionable access door and said removable and repositionable access door are maintained as a substantially flat surface when positioned in each of said plurality of closed positions.

11. The electrical box assembly of claim 10, wherein when said repositionable access door or said removable and repositionable access door is positioned in said closed in service position at least one cord port is revealed.

12. The electrical box assembly of claim 10, wherein said repositionable access door or said removable and repositionable access door has a first gasket positioned around all edges of a bottom side of said repositionable access door or said removable and repositionable access door, respectively, and a second gasket positioned around all edges of a top portion of a recessed box.

13. The electrical box assembly of claim 10, wherein said outlet box and said electrical box comprise a single integrated box having both outlet box and electrical box components.

* * * * *